United States Patent

[11] 3,611,371

| [72] | Inventor | Milton Morse |
| | | 1 Horizon Road, Fort Lee, N.J. 07024 |
| [21] | Appl. No. | 818,691 |
| [22] | Filed | Apr. 23, 1969 |
| [45] | Patented | Oct. 5, 1971 |

[54] MOSAIC OMNIDIRECTIONAL RADAR SCANNING SYSTEM
5 Claims, 7 Drawing Figs.

[52] U.S. Cl. .................................................. 343/7.7,
343/5 CD, 343/7.9, 343/112 CA
[51] Int. Cl. ........................................................ G01s 9/42,
G01s 7/20
[50] Field of Search ............................................ 343/7.7,
7.9, 112.4, 5 CD

[56] References Cited
UNITED STATES PATENTS
2,457,199  12/1948  Best .............................. 343/112.4 UX

| 3,046,548 | 7/1962 | Briskin | 343/7.7 |
| 3,074,061 | 1/1963 | Pidhayny et al. | 343/112.4 X |
| 3,089,139 | 5/1963 | Hovannesian et al. | 343/112.4 |
| 3,095,560 | 6/1963 | Castellini | 343/112.4 X |
| 3,134,975 | 5/1964 | Goodman | 343/112.4 UX |
| 3,275,882 | 9/1966 | Morse | 343/7.9 UX |
| 3,321,758 | 5/1967 | Elliott | 343/7.9 |

*Primary Examiner*—T. H. Tubbesing
*Attorney*—Charles E. Temko

ABSTRACT: A radar-type environmental warning device in which displays corresponding to objects located in the vicinity of the aircraft are presented on a spherically shaped or planar display. Means is provided for distinguishing objects which are approaching the surveillance aircraft from those which are receding therefrom, and for indicating relative distance between a sensed object and the aircraft in terms of size and shape of individually displayed received signals.

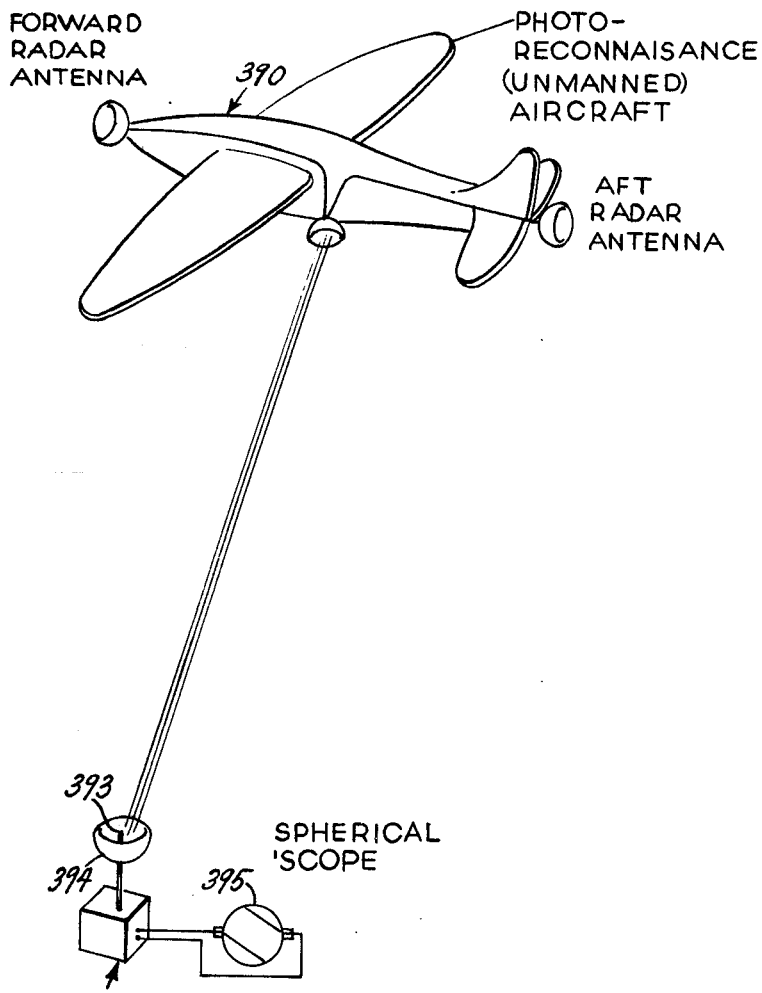
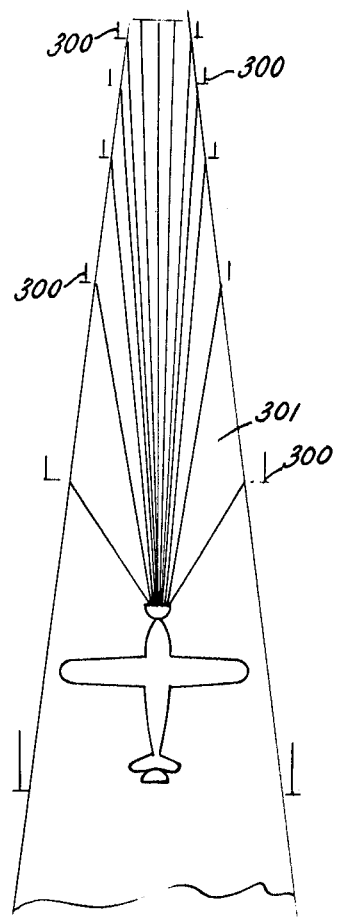
*Fig.3*  *Fig.4*
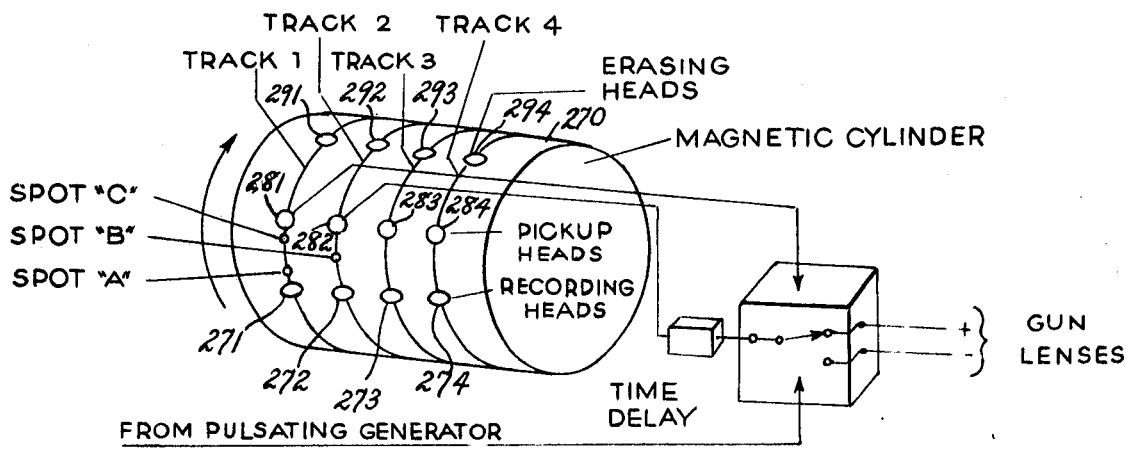
*Fig.5*

MOSAIC OMNIDIRECTIONAL RADAR SCANNING SYSTEM

This invention relates to a safety warning device for use on high-speed aircraft, and more specifically, it deals with a continuous airborne omnidirectional radar surveillance system.

Surveillance is accomplished by a close pattern of radar probes, and the returning information appears as a mosaic on a spherical oscilloscope. The oscilloscope is transparent, and the echoes which appear on the far side of the sphere are visible through the near surface of the oscilloscope. In addition to the visual information, this system will also give audible indications of danger. The system can also be associated with an automatic pilot, so that evasive maneuvers may automatically be taken in certain emergencies. The continuous mosaic of nearby aircraft precludes the possibility that evasive maneuvers may avoid some problems and create new ones thereby.

Accordingly, it among the principal objects of the present invention to provide a means whereby the pilot or pilots of individual aircraft may have a continuous view in all directions of all aircraft within a sphere of approximately a 10 mile radius.

Another object of the invention lies in the provision of means including a spherical oscilloscope fed by external antenna arrays supplying information which may generate visible signals on the oscilloscope, whereby the pilot may be apprised of his position relative to other aircraft within the above mentioned radius, including the area above and below the aircraft.

Yet another object of the invention lies in the provision of means for indicating whether or not a disclosed aircraft is approaching or receding with respect to the surveillance aircraft in which the device is installed.

Still another object of the invention lies in the provision of means for illustrating the relative distance between sensed aircraft in terms of the size of a displayed signal.

These objects, as well as other incidental ends and advantages, will more fully appear in the progress of the following disclosure, and be pointed out in the appended claims.

In the drawings, to which reference will be made in the specification, similar reference characters have been employed to designate corresponding parts throughout the several views.

FIG. 3 is a schematic view in perspective showing a modification of the disclosed embodiment for use with unmanned aircraft.

FIG. 4 is a schematic view showing the use of the embodiment as a landing or takeoff assistance means.

FIG. 5 is a schematic view showing an approach discriminator forming a component of the second embodiment.

Figure 6:
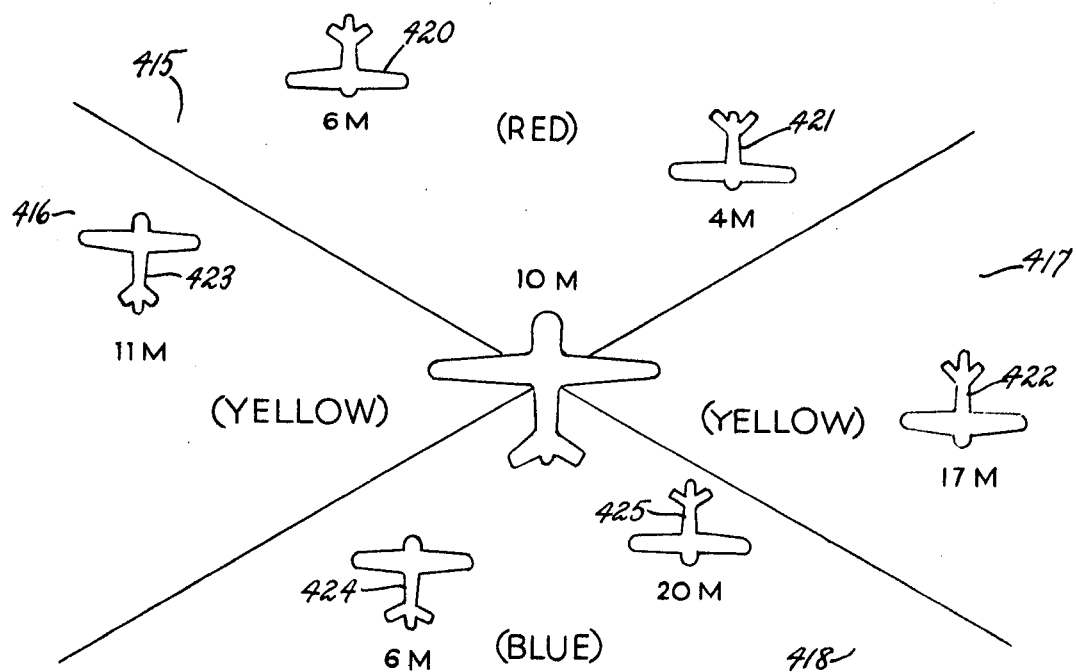
FIG. 6 is a schematic view showing a typical crowded aircraft situation encountered when using a third embodiment of the invention.
Figure 7:
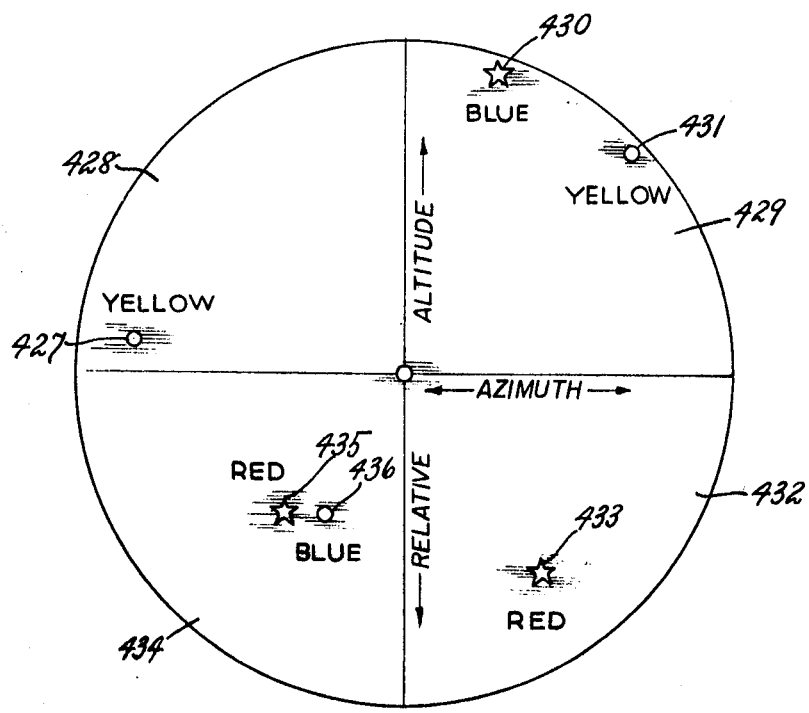

FIG. 7 is a schematic view of a generally planar cathode-ray tube face indicating a traffic situation corresponding to that seen in FIG. 6. The problem of overcrowded airspace is an increasing hazard for aircraft which are taking off and landing at airfields. To this is added the problem of crowded air corridors. The increase in speeds of aircraft adds to the crowding and the danger. The present invention enables the pilot or pilots of aircraft to have a continuous view in all directions of all aircraft within a sphere having a 10 mile radius. To accomplish this, use may be made in two of the disclosed embodiments of the transparent spherical oscilloscope described in my U.S. Pat. No. 3,275,882 granted June 5, 1966. Through the use of herein described circuitry, continuous information is fed to the spherical oscilloscope from external antenna arrays. This information generates visible signals on the oscilloscope and these apprise the pilot of his position relative to all other aircraft within a 10 mile radius, including the area above and below the surveillance aircraft.

An airplane traveling at a speed of 700 miles per hour flies 1 mile in 5 seconds. Therefore, two 700 miles per hour aircraft will close at the rate of 1 mile in 2.5 seconds. A 10 mile separation between two closing aircraft will allow 25 seconds for maneuvering. This should be sufficient time for the pilot or pilots to react. The omnidirectional radar system with its 10 mile radius is based upon the following arithmetic: a radar pulse travels at 186,000 miles per second. The round trip for a 10 mile radius will be 20 miles, and this trip will require 20/186000 seconds, or 0.000107 seconds.

Let us scan a circle in 2 °arcs. The transmitter will pulse once per arc, or 180 times per scan-circle. Therefore, each complete scan-circle will require 180×0.000107 seconds, or 0.0192 seconds. Although the scan-circle time is calculated herein at 0.0192 seconds for a 10 mile radius, the transit time for signals passing through the various coaxial lines and circuits will introduce a certain amount of time delay, and accordingly, the scan-circle time must be adjusted to compensate for these delays in order to maintain the desired radar horizon. From the foregoing, it becomes apparent that a slower scan-circle will permit surveillance of a sphere with a larger radius.

The transmitter will pulse for 1 microsecond at the start of each arc, but the receiver will be open and receiving during the entire circle. A 1 microsecond transmitter pulse will mask any objects which are closer than 352 yards. A pulse of one-half microsecond (500 nanoseconds) would reduce the mask range to 176 yards. Shorter pulses may be used, but due to the scanning rate of the system, these very close targets would be lost in the time between scans. In other words, the pilot must certainly not allow another plane to approach to 176 yards without having taken evasive action. The number of circles per hemisphere will be 30. Therefore, each hemisphere will be divided into 30×180=5,400 surveillance-cones. Each surveillance-cone will be 2°wide and 3 °high. If each surveillance-cone is explored in 0.000107 seconds, and if there are 180 surveillance-cones per scan-circle, and if there are 30 scan-circles per hemisphere, then the complete raster per hemisphere will require 0.000107 seconds × 180×30=0.5778 seconds. As previously mentioned, these theoretical figures can be varied to increase or decrease the range of the radar system.

The top and bottom hemispheres of the oscilloscope are scanned simultaneously with tandem electron guns, and each gun is fed by information from tandem antenna systems. Therefore, the entire sphere will be reviewed once every 0.5778 seconds.

Two sets of transmitting and receiving antennae are used. Each antenna set is enclosed in a radome, one on the upper surface of the plane, and the other on the underbelly. In this manner, there will be no shadow, since the top and bottom surveillance hemispheres meet at the horizontal equator.

Figure 1:
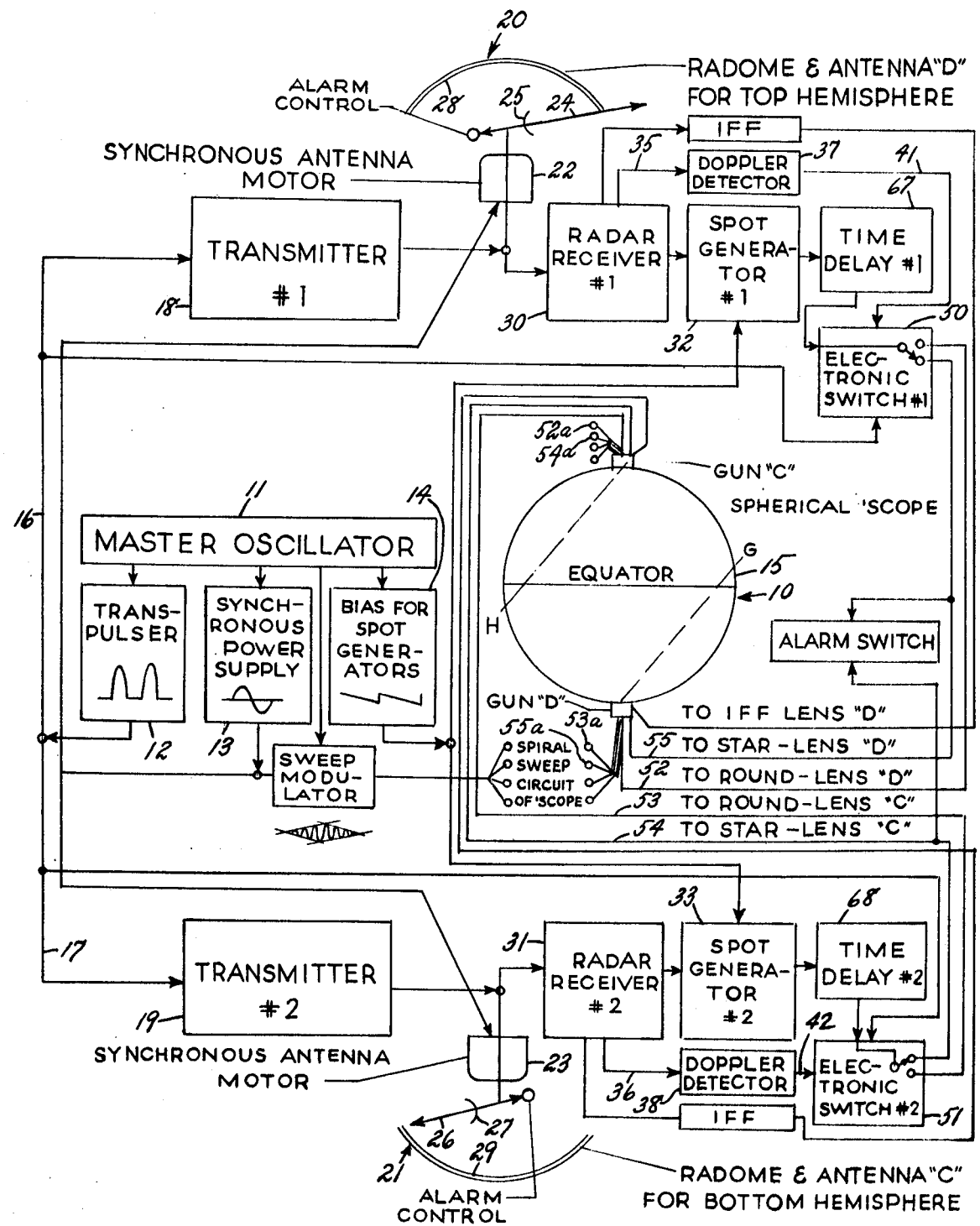
FIG. 1 is a schematic view of a first embodiment of the invention.
Figure 2:
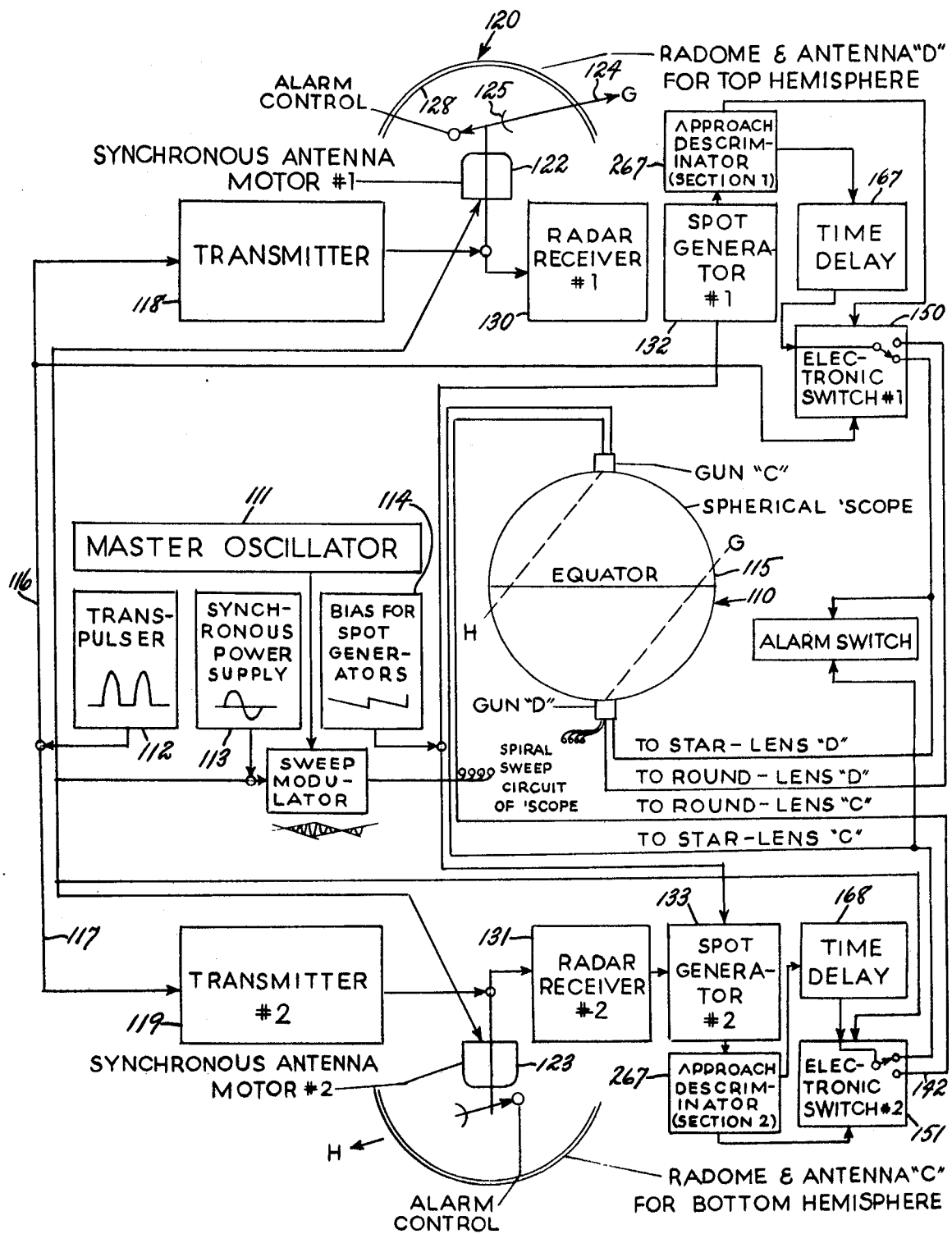
FIG. 2 is a schematic view showing a second embodiment of the invention.

The electron guns and the electrical leads associated therewith may be brought out at the bottom and top of the oscilloscope, as shown in FIGS. 1 and 2 in the drawings. An alternate location would be to put one antenna in the nose and the other in the tail of the aircraft, as shown in FIG. 3.

There are actually two sets of antennae. The one in the nose of the aircraft feeds its information to the forward-pointing electron gun of the spherical oscilloscope (U.S. Pat. No. 3,275,882). The one in the tail of the aircraft is circuited to the rearward-pointing electron gun. This creates two nonfunctioning spots on the oscilloscope, but these "blind spots" exist only in the oscilloscope, since the system which feeds the information to the oscilloscope will still be scanning these areas, and in the event of an emergency, alarms would still function and/or the automatic pilot would still perform an evasive maneuver.

The returning echoes are not fed directly to the oscilloscope guns. Instead, the returning signals are used to actuate spot-generators, and the output from the spot-generators is fed to the electron guns. In this manner, a very large aircraft will not cause a larger spot on the oscilloscope than a very small one.

If the spot-generators were to put out spot signals of uniform size, then all aircraft would appear alike on the oscilloscope, irrespective of their distance from the surveillance aircraft. In order to indicate relative distances, the output of the spot-generator is controlled by a saw-toothed bias which is triggered by the transmitter pulser at the start of each surveillance-cone. Thus, the longer interval of time required for an echo to return, the smaller will be the output of the spot-generator, and, accordingly, the more distant a plane is located from the surveillance aircraft, the smaller will be the spot on the oscilloscope screen.

It is also important for the pilot to know which aircraft are approaching him and which are not. In order to accomplish this, another unit referred to as a "Doppler detector" is employed. The Doppler detector functions on the principle that the radar echos from approaching aircraft will shift slightly toward a higher frequency. The detector detects this shift, and then circuits the output from the spot-generator through an electronic switch to a star lens on the electron gun. This star lens causes the spot on the oscilloscope to appear star shaped instead of round. A small time delay in the output of the spot-generator gives the Doppler detector time to actuate the electronic switch. The time delay, which is inherent in the Doppler detector, eliminates the confusion which might arise from echos which are neither receding nor approaching. Thus, the pilot of the surveillance aircraft is told not only the relative proximity of all aircraft within his surveillance sphere, but he is also informed which of those aircraft are approaching him so that he may take proper action.

Due to the very high radar frequencies involved, the Doppler detector will be called upon to detect frequency shifts which are a very small fraction of the transmitter frequency. If the Doppler receiver system should not be sufficiently discriminative, an alternate method may be used which employs an approach discriminator utilizing a rotating magnetic drum. Sequential echos are recorded on the drum, and subsequent echos are compared with previous echos. If the time gap between successive echos diminishes, then the output from the spot generator is circuited to the star lens of the oscilloscope using the same general circuitry as the Doppler detector method. An alarm switch is placed in the star lens circuits of the oscilloscope. When the star signals reach a critical voltage, an audible alarm warns the pilot that the approaching aircraft is dangerously close. An attitude switch on the antenna discriminates between nearby aircraft which are on substantially the same altitude as the surveillance aircraft, and those which are above and below the surveillance aircraft, outside a predetermined solid angle. The attitude switch controls alarm systems.

The electron guns in the spherical oscilloscope are completely blanked at all times, except when a returning signal causes a spot to appear. Thus, the oscilloscope areas between target signals will not be illuminated, and since the unlighted areas on the spherical oscilloscope are transparent, any spots which appear on the far side of the sphere will be readily visible through the near surface thereof. The center of the oscilloscope at all times represents the location of the surveillance aircraft.

Interference from the radar system of other aircraft is limited, as indicated by the following computation.

There are 5,400 surveillance-cones in each hemisphere of surveillance. The probability of any two surveillance antenna being directed into coinciding surveillance-cones will be 1/5,400, but if there are 20 aircraft within the same sphere and if each of these aircraft is equipped with an identical system, then the probability increases to 1/270, which is approximately four-tenths of 1 percent.

This omniversal radar system has many applications beside aircraft surveillance. For example, the present Distant Early Warning System (DEW) would be more easily observed by use of the present system. In the later case, radar information from an observer satellite (or several satellites) may be circuited to the oscilloscope through similar circuitry in order to provide a continuous view in all directions.

The present system is also applicable for use in space vehicles. In such case, the areas scanned must be much larger, since meteors and the like travel at many thousands of miles per hour, and warning must be received from a greater distance in order that the pilot of the spacecraft may have time to take evasive action. Whenever such great distances are involved, a multiple antenna and a corresponding multiple electron gun system would be necessary so that many sectors of space would be scanned simultaneously.

The system can also be used aboard ships and submarines to detect and locate submerged objects. In the latter application, SONAR transmitters and receivers replace the radar antenna.

In the drawings, circuit details of each unit are not elaborated, since all are well known to those skilled in the art to which the present invention relates.

With the foregoing discussion in mind, reference may now be made to the drawings, in which the first embodiment of the invention, illustrated in FIG. 1, and generally indicated by reference character 10, includes a master oscillator 11, controlling the operation of a transmitter a pulser 12, a synchronous power supply 13, a bias for spot-generators, which is a wave generator 14, and a spherical oscilloscope 15.

The spherical oscilloscope is constructed along the teachings set forth in my U.S. Pat. No. 3,275,882. There are two electron guns protruding slightly into the sphere, and the two guns are set into protruding necks in the opposite hemispheres (180°apart). The electron guns consist of a typical arrangement of cathodes, electron lenses, and electrostatic deflection plates.

The deflection plates are circuited to the synchronous power supply in such manner as to cause each emerging electron beam to spiral from the center of the oppositely disposed hemisphere outwardly to the equator of that hemisphere, and (in this particular application) the next sweep of the electron beam spirals from the equator back to the center of that opposite hemisphere.

There are two beam-shaping lenses in each electron gun assembly. One lens causes a round spot to appear on the fluorescent inner surface of the sphere and the other lens causes a star-shaped spot to appear.

As seen in FIG. 1, the oscilloscope is used as a radar scope, with an upper and a lower hemisphere. The lower and upper electron guns are independently fed by the upper and lower antenna system, comprising transmitting and receiving elements 24,25; and transmitting and receiving elements 26, 27, respectively. In actual practice, as has been mentioned, it may be desirable to place one antenna in the nose of the aircraft, and the other in the tail. In the latter case, the spherical oscilloscope will be shifted 90°about a horizontal axis, but the principal functions remain the same. Mechanically, the scope is supported by the protruding necks on each hemisphere. As has been mentioned, although the center and the upper and lower or forward and rearward hemispheres of the scope (depending upon the positioning and orientation thereof) are unable to portray any visible spots due to the location of the two electron guns, the radar system which supplies information to these areas will still be functioning, and may still trigger warning devices in the event of danger.

The transmitter pulser 12 is connected through conductors 16 and 17 to first and second radar transmitters 18 and 19, respectively. The radar transmitters communicate with, respectively, first and second radome elements 20 and 21, each having a synchronous antenna motor as at 22 and 23 driving, sending and receiving antennas 24 and 25 covering the upper 180°solid angle of reception, and sending and receiving antennas 26 and 27, respectively, covering the lower 180°angle. As has been mentioned, the sending and receiving antennas are preferably located within dome structures 28 and 29, respectively, situated on the upper and on the underbelly surfaces of the aircraft (not shown), or, in the alternative, may be located fore and aft.

The radar receivers 30 and 31 operate in the 10,000 megacycle range and respond to a radar pulse of 500 nanoseconds. In order to respond to this high frequency, the radar receivers must have a band width of at least 500 nanoseconds. The gain of the receiver is determined by the power output of the transmitters and also by the parametric considerations of the reflecting surfaces of other probable aircraft.

Radar receivers 30 and 31 detect echo signals, and produce output pulses which unblank spot-generators 32 and 33. Depending upon the time in which the pulse is received, the actual video signal generated will fall at a given point on the saw-tooth wave produced by the generator 14, that is to say, the shorter the echo time, the higher the point on the saw-tooth wave controlling the bias, and the signal produced will be correspondingly stronger. The exiting signal is fed either from conductor 35 or conductor 36 to the corresponding Doppler detector 37–38.

Each Doppler detector functions on the principle of frequency shift which results when the radar echos are being reflected from a relatively approaching surface (aircraft or mountaintop).

If the frequency of the radar transmitter is 10,000 megacycles per second, and if the other aircraft is approaching at a rate of X meters per second, then the Doppler detector must respond to a frequency shift equal to the number of cycles per meter-second, which is equal to the rate of approach of the reflecting surface. In the normal course of events, this Doppler shift will be equal to a very small fraction of the carrier frequency, and, therefore, the Doppler detector must be highly selective, and must respond to a pulse as short as 500 nanoseconds. These two requirements are diametrically opposed, but the present state of the art allows a compromise design which will yield a sufficiently strong impulse to actuate the Doppler detector. The output of the Doppler detectors 37 and 38 goes to electronic switches 50 and 51 via conductors 41 and 42, and said switches are connected to the display element or oscilloscope 15 by conductors 52, 53 to round lens outputs 52a and 53a, and conductors 54 and 55 to star lens outputs 54a and 55a.

When the output from the Doppler detector actuates the electronic switch, then the output from the spot projector will be circuited to the star-shaped lenses, but only when the Doppler detectors 37 and 38 respond to a shift toward a higher frequency. Thus, response is only to an approaching aircraft. If the other aircraft is not approaching, or if it is actually receding, then the Doppler device will not respond, and only the round spot will appear on the scope 15.

As described, the oppositely disposed electron guns are substantially the same as disclosed in my prior U.S. Pat. No. 3,275,882, and each of the guns is provided with a star shaped and round lens responsive to the detection of Doppler effects in received signals. In addition, time delay means 67 and 68 are provided to slightly delay the output of the spot-generators 32 and 33 to the Doppler detectors 37 and 38 with respect to signals received directly from the radar receivers 30 and 31, to assure that observed objects maintaining a constant distance with respect to the surveillance aircraft do not appear as approaching aircraft.

Friendly aircraft can radiate or transpond a friendly signal which effects a third beam-shaping lens (not shown) in the scope 15. This latter lens produces a circle or halo which surrounds the typical echo spot. The halo (or other friendly configuration) will enable the surveillance pilots to distinguish between friendly and enemy aircraft.

This construction is optional, and principally of value in military installations.

Turning now to the second embodiment of the invention, illustrated in FIG. 2 in the drawing, parts corresponding to those of the first embodiment have been designated by similar reference characters, with the additional prefix "1."

It will be appreciated that in radar devices, wide band tuning is required in order to receive signals of varying frequencies, which reception is necessary for operation of the Doppler detectors. At the present state of development of the art, Doppler detectors function most efficiently in conjunction with narrow band tuning, and the second embodiment, generally indicated by reference character 110, provides an approach discriminator 267 controlling an electronic switch 150 –151 for each of the two scanned hemispheres.

The mechanical details of the approach comparator are illustrated in FIG. 5 in the drawing, wherein a drum 70 of 16 inches in diameter is suitably mounted for rotation about its own principal axis in synchronism with the synchronous power supply 113. The approach discriminator system functions by measuring the time distance between the most recently received echo and the previous echo for each individual pulse echo corridor.

There are 180 surveillance-cones per scan-circle, and there are 30 scan-circles, per hemispheres, as has been mentioned. Therefore, there is space for 5,400 echos or surveillance-cones on each hemisphere of the spherical oscilloscope 115. The approach discriminator system operates on the principle of measuring the time difference between the most recently received echo in a particular surveillance-cone and the previously received echo in that same surveillance-cone.

The electromechanics of the approach discriminator consists of a set of four magnetic recording heads, 271, 272, 273 and 274, as well as four magnetic pickup heads 281, 282, 283 and 284, followed by four erasing heads 291, 292, 293 and 294 set in the arrangement shown on the rotating drum 270 of magnetic recording material.

The drum 270 makes one revolution for each double raster-scan of the scope 215. The spacing between the recording heads and the pickup heads on the drum is determined by the time required to scan one surveillance-cone. This is equivalent to 0.000107 seconds. If this spacing is reduced to 0.010 inch, then the circumference of the entire drum will be equal to 54 inches, equivalent to 16 inches in diameter. The location of the erasing heads is not critical.

The sequence of operation, for example, for the upper hemisphere of the scope 115 is as follows:

1. A radar pulse is transmitted from an antenna 124, and the same pulse from the pulse generator or transmitter pulser 112 that triggers the transmitter 118 also shifts the electronic switch to the star-shaped lens of the scope gun. 2. Signal "A" was previously recorded on the drum at point "A" on track 01 by recording head 271.

3. On this rotation of the drum 270, echo "B" is recorded at position "B" on track 02 by recording head 272. (It should be noted that on this rotation of the drum, the output from pickup head 281 is keyed to shift the electronic switch 150 from the star-shaped lens to the round lens.) As the drum rotates in the direction of the arrow, the positions on track 01 and track 02 approach a respective pickup head. Since the other aircraft is approaching, the position "B" on track 02 will reach its respective pickup head before position "A " reaches its respective pickup head, and, accordingly, the output impulse from the former will pass through the electronic switch 150 and onto the star-shaped lens before the impulse from the latter can shift the electronic switch back to the round lens. It follows that echo "B" will appear as a star-shaped spot on the scope. During this rotation of the drum, erasing head 291 was continuously erasing track 01 as it emerged from under the pickup head 271.

4. On the next rotation of drum 270, the outputs from pickup head 281 and pickup head 282 are reversed. Thus, the output from pickup head 282 will be circuited to shift the electronic switch to the round lens whereas the output from pickup head 281 will now feed through the electronic switch 150 and on to the star-shaped lens.

5. On this rotation of the drum, the same sequence of events occurs as previously, but with track 01 performing the functions that were performed by track 02, and track 02 performing the functions that had been performed by track 01. During this rotation, therefore, the echo "C" will reach pickup head 281 and pass on through the electronic switch 150 to the star-shaped lens before the output from pickup 282 (echo "B") can shift electronic switch 150 to the round lens. In this case, again, the spot on the scope 215 will appear as a star.

Consider the situation if the observed aircraft is moving away from the surveillance aircraft. Spot "B" would reach pickup head 282 before spot "C" reaches pickup head 281. In the latter case, the output from pickup 282 would have shifted electronic switch 150 to the round lens, and the output from pickup 281 would have passed through electronic switch 150 to the round lens. The electronic switch 150 always remains in its last position until or unless it is acted upon by one of the deflecting impulses.

As noted hereinabove, at the start of each cone-scan, the pulse generator or transmitter pulser 112 which triggers the transmitter, will also throw electronic switch 150 to the star-lens. From that point on, signals which appear on the scope will always appear as star-shaped (approaching) aircraft unless the impulse from the adjacent track throws the electronic switch to the round lens. The passage of the spot signal through the electronic switch is delayed for a very short period by time delays 167 and 168, so that if the observed aircraft is neither approaching nor receding and if both impulses reach both respective pickup heads simultaneously, the switch impulse will take precedence, and will throw the electronic switch to the round lens before the other signal can reach the scope. Accordingly, aircraft which are not approaching the surveillance aircraft will not appear as star-shaped signals.

The lower hemisphere of the oscilloscope 115 operates in precisely the same manner, using pickup heads 283 and 284.

Turning now to the embodiment illustrated in FIG. 3 in the drawings, the invention may also be employed in those applications where an unmanned aircraft 390 is controlled from a ground station 391.

The information which appears on the spherical oscilloscope of the surveillance plane may be transmitted to a ground observer, or a ground control station using transmitting and receiving antennas 393 and 394, respectively. The transmitted information is reconstituted on a duplicate spherical scope 395 for observation by ground personnel who may then guide the surveillance plane either through voice or by take over of the automatic pilot control (not shown).

Another arrangement provides for the use of unmanned surveillance planes and a base station control. Where information-gathering, unmanned aircraft are used for military purposes, mosaic information which would normally appear on the scope in the cockpit may be transmitted to ground control stations. Unmanned aircraft which are so equipped may be maneuvered with great accuracy. The accuracy of the ground control MORSS enables trained ground personnel to actually evade and/or fight enemy aircraft. The evasive maneuver adjunct would still cause the unmanned airplane to dodge certain missiles and to evade barrier balloons and other obstacles. The unmanned aircraft still would be free to perform photographic and other information gathering functions. Transfer of control may also be made to an accompanying unmanned aircraft. Mosaic information may be relayed via satellite to accomplish long-distance control wherever this function is advantageous, such as in the case of high-velocity guided intercontinental ballistic missiles.

In the operation of the present system, dual frequency radar may be employed. This system is intended to eliminate spurious signals and ambient noise reactions. The principle consists of a dual frequency radar pulse and a dual frequency detector. The receiver circuitry eliminates any oscilloscope reaction unless the returning echo appears in the two predetermined frequencies in the dual detector system. This latter development may be used on other radar systems as well as the present one.

As seen in FIG. 4, aircraft which are equipped with the present system may shift the lower surveillance hemisphere to a different circuit. In this secondary circuit, the radar pulse will trigger a row of transponders 300 which run down the sides of a runway 301. These transponders will create two rows of spots on the bottom hemisphere of the scope, and the aircraft is guided by these spots both for takeoff and for landing. Additional spots on the landing and takeoff patterns will serve to hold the aircraft on a proper approach path.

Referring now to FIGS. 6 and 7 in the drawing, there is illustrated a further modification, in which the spherical oscilloscope is replaced by a more conventional-type cathode ray tube, in which the phosphor coating changes color with a change in electron-beam voltage. Such tubes are presently known in the art in experimental form, and require little if any modification for use contemplated by the present invention.

The spherical area surrounding the surveillance airplane is depicted on the flat tube face which provides a generally circular display. Aircraft located in front of the surveillance airplane appear in one color, while aircraft in back of the surveillance airplane appear in another color. As the aircraft move toward the boundaries of a solid angle extending with the surveillance aircraft disposed at the apex, they pass through an intermediate color. With the proper choice of persistence, the phosphor leaves a small tail on one or the other edge of a laterally moving representation on the display, and this serves to indicate the direction of motion. As in the other embodiments, the size of the spots displayed indicates the relative proximity, rather than the size of the aircraft. The shape of the spot indicates whether it is approaching or receding from the surveillance plane, and the color in which the spot is displayed is dependent upon the location of the observed aircraft within the forward and rearwardly extending solid angles, or the intermediate area on the sides of the aircraft. Most conveniently, the forward solid angle will be approximately 135° in scope, as can the rear solid angle.

Referring to FIG. 6, there is illustrated a plan view of a typical crowded traffic pattern which corresponds to the relative altitude representation shown in FIG. 7. A forward zone 415 contains aircraft which will be represented on the display in red, while left- and right-hand intermediate zones 416 and 417 contain aircraft which will be represented in yellow. The rear zone 418 contains aircraft represented in blue.

Assume the surveillance aircraft to be flying at an altitude of approximately 10,000 feet. In the zone 415 is a first plane 420 flying at 6,000 feet toward the surveillance plane, and a second aircraft 421 flying in the same direction at 4,000 feet. The intermediate zones 416 and 147 each contain a single plane, including one indicated by reference character 422 flying at 17,000 feet, and a second indicated by reference character 423 flying at 11,000 feet. Finally, the rear zone 418 contains two aircraft, one, designated by reference character 424 flying at 6,000 feet, and another, 425 flying at 20,000 feet in an opposite direction.

Referring to FIG. 7, aircraft 423 is represented by a yellow round spot 427, indicating that it is in the yellow zone and flying away from the surveillance aircraft. This is displayed in appropriate position in the upper left quadrant 428 of the display area. The upper right quadrant 429 displays a star shaped blue spot 430 corresponding to aircraft 425, indicating that the aircraft is behind the surveillance aircraft, and is receding. A yellow round spot 431 corresponds to aircraft 422, and indicates that the aircraft is in a side zone.

The lower right quadrant 432 displays a single red star-shaped spot 433 which corresponds to aircraft 421, indicating the presence of the aircraft in the forward solid angle, as well as the fact that it is approaching the surveillance aircraft. The lower left-hand quadrant 434 displays a red star-shaped spot 435 corresponding to the aircraft 420, and a blue round spot 436 corresponding to the aircraft 424.

I wish it to be understood that I do not consider the invention limited to the precise details of structure shown and set forth in this specification, for obvious modifications will occur to those skilled in the art to which the invention pertains.

I claim:

1. A mosaic omnidirectional radar scanning system for surveillance aircraft comprising: a pair of sending and receiving radar antennae substantially covering in total a 360° solid angle of transmission and reception, synchronized motor means for driving said plurality of antennae in unison; a spherically shaped display element including a transparent sphere having a fluorophor-coated inner surface, a pair of oppositely directed electron-beam guns mounted within said sphere, said guns covering substantially a 360° solid angle of projection, and operating in synchronism with said antennae; radar pulse generating means, a pair of radar transmitters connected respectively to each of said sending radar antennae, a pair of radar receiver means, a pair of spot-generator means actuated by the presence of a received signal from a respective radar receiver means, means for directing a received signal to one of said electron guns for display upon the inner surface of said sphere, and saw-tooth wave generator means for biasing said spot-generator means such that the size of a display signal is related to the distance from a detected object.

2. Structure in accordance with claim 1, including means for distinguishing between approaching detected objects and receding detected objects, and altering the character of a displayed signal with reference thereto.

3. Structure in accordance with claim 2, including means for detecting the presence of an approaching aircraft by measuring the Doppler shift of a received radar signal, and causing one of said guns to operate in the presence of said such signal.

4. In a radar-type environmental warning device for aircraft including oscilloscope means for displaying signals corresponding to detected aircraft, improve means for distinguishing whether the detected aircraft is approaching or receding, including means for detecting a Doppler shift in signal frequency between successive received signals corresponding to the same object, and means for altering the observed appearance of a continuously displayed trace corresponding to said signals in accordance with such detection; said Doppler shift detecting means including a rotating drum having a pair of magnetized bands on an outer surface thereof, each of said bands having an associated recording head, pickup head and erasing head means for directing successive received pulses to be recorded on one of said bands in alternate fashion.

5. A mosaic omnidirectional radar scanning system for aircraft comprising: a pair of sending and receiving radar antennae substantially covering in total a 360° solid angle of transmission and reception, synchronized motor means for driving said plurality of antenna in unison, a display element including a spherical cathode-ray tube having a fluorophor coated inner surface forming a generally planar display area, a pair of oppositely directed electron-beam guns mounted within said cathode-ray tube, the beams emanating from said guns to each substantially cover the entire area of said display, and in synchronism with said antennae; radar-pulsed generating means, a pair of radar transmitters connected respectively to each of said sending radar antennae, a pair of radar receiver means, a pair of spot-generator means actuated by the presence of a received signal from a respective radar receiver means, and means for directing a received signal to one of said electron guns for display upon said display area; said coated inner surface having a fluorophor responsive in terms of color with respect to electron-beam voltage, and means for varying the voltage of an electron beam depending upon the angle of incidence of a received signal with respect to the line of flight of the surveillance aircraft.